United States Patent
Schepis et al.

(10) Patent No.: US 8,631,457 B1
(45) Date of Patent: Jan. 14, 2014

(54) METHOD AND APPARATUS FOR MONITORING TEXT-BASED COMMUNICATIONS TO SECURE A COMPUTER

(75) Inventors: Adam P. Schepis, Milford, MA (US);
Matt Boucher, Merrimack, NH (US);
Keith Newstadt, Newton, MA (US);
Robert Walters, Southern Shores, NC (US)

(73) Assignee: Symantec Corporation, Mountain View, CA (US)

( * ) Notice: Subject to any disclaimer, the term of this patent is extended or adjusted under 35 U.S.C. 154(b) by 1124 days.

(21) Appl. No.: 12/264,688

(22) Filed: Nov. 4, 2008

(51) Int. Cl.
*G06F 17/00* (2006.01)

(52) U.S. Cl.
USPC ........ 726/1; 726/13; 726/14; 726/22; 726/24; 726/25; 709/225; 709/229; 715/752; 715/764; 715/804

(58) Field of Classification Search
USPC .......... 726/1, 22, 25, 26, 13, 14, 24; 715/752, 715/764, 804; 709/225, 229
See application file for complete search history.

(56) References Cited

U.S. PATENT DOCUMENTS

| | | | | |
|---|---|---|---|---|
| 6,879,926 | B2 * | 4/2005 | Schmit et al. | 702/123 |
| 6,965,800 | B2 * | 11/2005 | Schmit et al. | 700/29 |
| 7,593,605 | B2 * | 9/2009 | King et al. | 382/313 |
| 8,112,799 | B1 * | 2/2012 | Loiodice et al. | 726/22 |
| 2005/0188419 | A1 * | 8/2005 | Dadhia et al. | 726/1 |
| 2006/0069635 | A1 * | 3/2006 | Ram et al. | 705/37 |
| 2006/0098899 | A1 * | 5/2006 | King et al. | 382/305 |
| 2006/0288420 | A1 * | 12/2006 | Mantripragada et al. | 726/25 |
| 2008/0086700 | A1 * | 4/2008 | Rodriguez et al. | 715/804 |
| 2008/0222717 | A1 * | 9/2008 | Rothstein et al. | 726/14 |
| 2009/0025084 | A1 * | 1/2009 | Siourthas et al. | 726/25 |
| 2009/0172517 | A1 * | 7/2009 | Kalicharan | 715/234 |
| 2009/0265755 | A1 * | 10/2009 | Hamilton et al. | 726/1 |
| 2010/0154061 | A1 * | 6/2010 | Ollmann | 726/24 |
| 2010/0183246 | A1 * | 7/2010 | King et al. | 382/305 |
| 2010/0242088 | A1 * | 9/2010 | Thomas | 726/3 |
| 2010/0306850 | A1 * | 12/2010 | Barile et al. | 726/25 |
| 2011/0085211 | A1 * | 4/2011 | King et al. | 358/474 |
| 2011/0087581 | A1 * | 4/2011 | Ram et al. | 705/37 |
| 2011/0184877 | A1 * | 7/2011 | McHugh et al. | 705/318 |
| 2012/0278388 | A1 * | 11/2012 | Kleinbart et al. | 709/204 |

* cited by examiner

*Primary Examiner* — Thu Ha Nguyen
(74) *Attorney, Agent, or Firm* — Wilmer Cutler Pickering Hale and Dorr LLP

(57) ABSTRACT

A method and apparatus for monitoring text-based communications to secure a computer is described. In one embodiment, the method for monitoring text-based communications to secure a computer includes defining at least one portion of the computer display that is associated with text-based communications and examining the at least one portion of the computer display to identify textual data within the text-based communications.

20 Claims, 3 Drawing Sheets

METHOD AND APPARATUS FOR MONITORING TEXT-BASED COMMUNICATIONS TO SECURE A COMPUTER

BACKGROUND OF THE INVENTION

1. Field of the Invention

Embodiments of the present invention generally relate to a computer system management. More particularly, the present invention relates to a method and apparatus for monitoring text-based communications to secure a computer.

2. Description of the Related Art

In a typical computing environment, an organization may employ any number of technologies to process, store, protect, recover, produce and secure mission critical data. For example, the organization may employ one or more data protection systems to backup and recover the mission critical data after a disaster or data corruption. As another example, the organization may employ one or more security systems to detect and/or mitigate network-based threats, such as viruses, intrusions, SPAM and/or the like.

Individuals within the organization may utilize various software applications (e.g., AOL Instant Messenger, Second Life, GOOGLE GChat and/or the like) to communicate textual data to computing devices within the computing environment as well as all over the world. The various software applications employ different protocols to correctly route the textual data from a source computing device to one or more destination computing devices. For example, an individual may use one or more email protocols, instant message protocols or virtual worlds to communicate with other individuals. Such protocols ensure that the textual data arrives at the one or more destination computing devices in entirety or near entirety. Furthermore, the various software applications may utilize a variety of visual components (e.g., thought clouds/bubbles, message boxes and/or the like) to present the textual data to the individual on a computer display.

As such, the organization may employ one or more content filters (e.g., at a network gateway, an email server and/or the like) to monitor and control text-based communications between computing devices within the organization and another computing device. Unfortunately, one or more content filters need to be constantly modified in order to effectively monitor and control text-based communications that are communicated through new protocols.

Therefore, there is a need in the art for a method and apparatus for monitoring text-based communications to secure a computer.

SUMMARY OF THE INVENTION

Embodiments of the present invention generally comprise a method and apparatus for monitoring text-based communications to secure a computer. In one embodiment, the method for monitoring text-based communications to secure a computer includes defining at least one portion of the computer display that is associated with text-based communications and examining the at least one portion of the computer display to identify textual data within the text-based communications.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
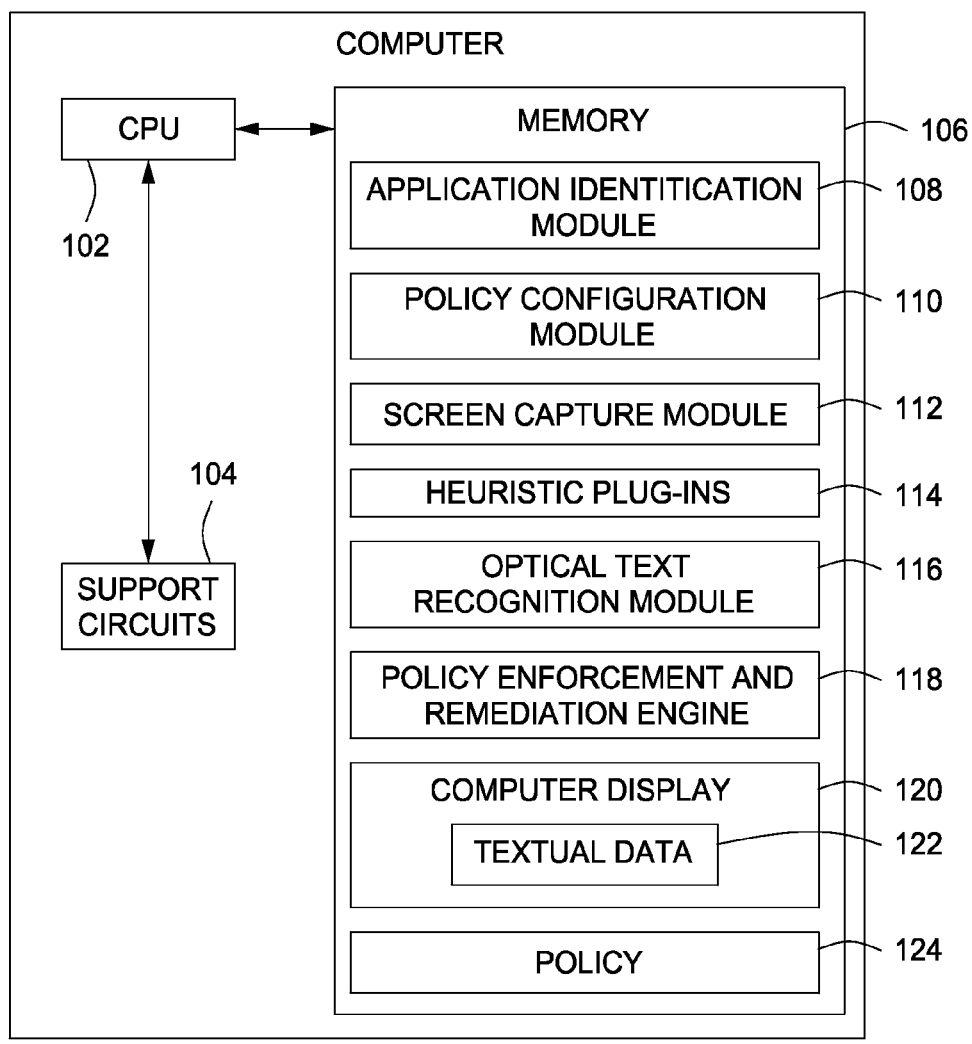
FIG. 1 is a block diagram of a computer 100 for monitoring text-based communications to facilitate information security according to one or more embodiments of the present invention.

FIG. 1 is a computer 100 for monitoring text-based communications to facilitate information security according to one or more embodiments of the present invention.

The computer 100 is a type of computing device (e.g., a laptop, a desktop, a Personal Desk Assistant (PDA), a tablet, a mobile phone and/or the like) that comprises a central processing unit (CPU) 102, various support circuits 104 and a memory 106. The CPU 102 may comprise one or more commercially available microprocessors or microcontrollers that facilitate data processing and storage. Various support circuits 104 facilitate the operation of the CPU 102 and may include clock circuits, buses, power supplies, input/output circuits and/or the like. The memory 106 includes a read only memory, random access memory, disk drive storage, optical storage, removable storage, and the like. The memory 106 includes various software packages, such as an application identification module 108, a policy configuration module 110, a screen capture module 112, one or more heuristic plug-ins 114, an optical text recognition module 116 and a policy enforcement and remediation engine 118.

The memory 106 further includes various data, such as a computer display 120 and a policy 124. In one embodiment, the computer display 120 may include a screen buffer that stores data (e.g., text, images, visual representation components and/or the like) to be presented to the user through a computer screen. The computer display further includes textual data 122, which may be located within one or more portions (e.g., areas of the computer screen). The policy 124 includes information that is applied to the computer display 122 in order to control text-based communications of the computer 100. In one embodiment, the policy 124 indicates one or more violations that may be committed by the textual data 122 as well as one or more remedial actions as explained further below.

According to one or more embodiments of the present invention, the application identification module 108 provides information regarding one or more software applications that facilitate text-based communications between the computer 100 and one or more computing devices. As explained further below, the text-based communications may be presented on the computer display 120 in various forms. In one embodiment, the application identification module 108 includes a database that organizes the information regarding the one or more software applications to be monitored.

For example, the database may provide file names, version information and/or hash values for the one or more software applications. Furthermore, the database may indicate one or more visual representation classes (e.g., MICROSOFT Windows Forms) utilized by the one or more software applications to produce and/or modify portions of the computer display 120. The database may also specify heuristics for recognizing text-based communications associated with the one or more software applications. In one embodiment, the database indicates one or more heuristic plug-ins of the heuristic plug-ins 114 that may be used to identify and/or define one or more portions of the computer display 120 that include such text-based communications.

The policy configuration module 110 interacts with a user to select the one or more software applications of which text-based communications are to be monitored. In one embodiment, the policy configuration module 110 generates an interface through which the user configures information (e.g., a policy) for monitoring and controlling the text-based communications.

The screen capture module 112 is configured to access and store the computer display 120. For example, the screen capture module 112 converts the data presented on a computer screen (e.g., a screen buffer) into an image (e.g., a GIF or JPEG file). In one embodiment, the screen capture module 112 may store the computer display 120 at a particular rate that may be throttled or configured to avoid adverse effects on computer performance.

The heuristics plug-ins 114 may include one or more software packages for defining one or more portions of the computer display 120 (e.g., the screen buffer) that are associated with text-based communications. In one embodiment, the heuristic plug-ins 114 may be configured to define portions within the computer display 120 that include text. For example, the heuristic plug-ins 114 may identify a portion of the computer display 120 where the text contrasts with a solid or nearly solid background. In another embodiment, the heuristics plug-ins 114 examines image data (e.g., pixel data) within the computer display 120 to identify various graphics and shapes, which are to be used to present the text-based communications. For example, a talk bubble may be employed to display one or more words spoken by an avatar in a virtual world (e.g., SECOND LIFE). As explained below, a portion of the image data that includes the text-based communications is analyzed by the optical recognition (OCR) module 116 to determine the textual data 122 according to one embodiment.

In one embodiment, a heuristic plug-in of the heuristic plug-ins 114 may correspond with a particular software application. For example, the heuristic plug-ins 114 may include a heuristic plug-in designed for AOL Instant Messenger (AIM) that identifies one or more instant message boxes within the computer display 120. Such a heuristic plug-in may further be configured to identify the textual data 122 (e.g., a conversation) in a first instant message box and an area for the user to type in a second instant message box. In one embodiment, the computer display 120 includes the first instant message box displaced above the second instant message box. As another example, the heuristic plug-ins 114 may include a heuristic plug-in designed for SECOND LIFE where one or more talk bubbles facilitate text-based communications within the virtual world. In one embodiment, the heuristic plug-in searches the computer display 120 for contrasting backgrounds to identify the one or more talk bubbles. In another embodiment, the heuristic plug-in compares various shapes within the computer display 120 to identify the one or more talk bubbles.

The optical text recognition module 116 cooperates with the heuristics plug-ins 114 to determine the textual data 122 within the text-based communications and/or extract the textual data 122 from the computer display 120. In one embodiment, the optical text recognition module 116 is configured to examine a portion (e.g., a particular shape or graphic within an image) of the computer display 120 (e.g., the screen buffer) as defined by the heuristic plug-ins 114. Then, the optical text recognition module 116 identifies the textual data 122 within the portion of the computer display 120. For example, the optical text recognition module 116 may compare the portion of the computer display 120 to characters of a particular typeface or script in order to perform the identification of the textual data 122.

In addition, the optical text recognition module 116 may be pre-configured with information to identify one or more portions of the computer display 120 that are associated with the text-based communications for a particular software application. In one embodiment, such information may define the one or more portions using one or more location offsets, one or more window identifiers and location data for one or more known icons or images. For example, text-based communications facilitated by AOL Instant Messenger version 6.8 are presented on the computer display 120 as a subwindow with a particular window identifier. On the other hand, text-based communications facilitated by YAHOO Instant Messenger version 9.0 are presented on the computer display 120 at a position that is five pixels below a certain image (e.g., "YIM.bmp"). As such, the optical recognition module 116 may determine the particular software application being used for the text-based communications and examine the one or more portions of the computer display 120 as defined by the pre-configured information to identify the textual data 122.

The policy enforcement and remediation engine 118 is configured to apply a policy to the textual data 122. In operation, the policy enforcement and remediation engine 118 accesses and scans the textual data 122 using the policy. Based on the policy, the policy enforcement and remediation engine 118 performs various activities on the textual data 122. In one embodiment, if the policy enforcement and remediation engine 118 determines that a portion of the textual data 122 violates the policy 124, then the portion of the textual data 122 may be removed from the computer display 120 and prevented from being transmitted through network resources. For example, the policy enforcement and remediation engine 118 may prevent the computer 100 from accessing the network resources to stop the text-based communications. In another embodiment, the policy enforcement and remediation engine 118 may simply log the violation of the policy by the portion of the textual data 122. Alternatively, the policy enforcement and remediation engine 118 may take no action at all.

Figure 2:
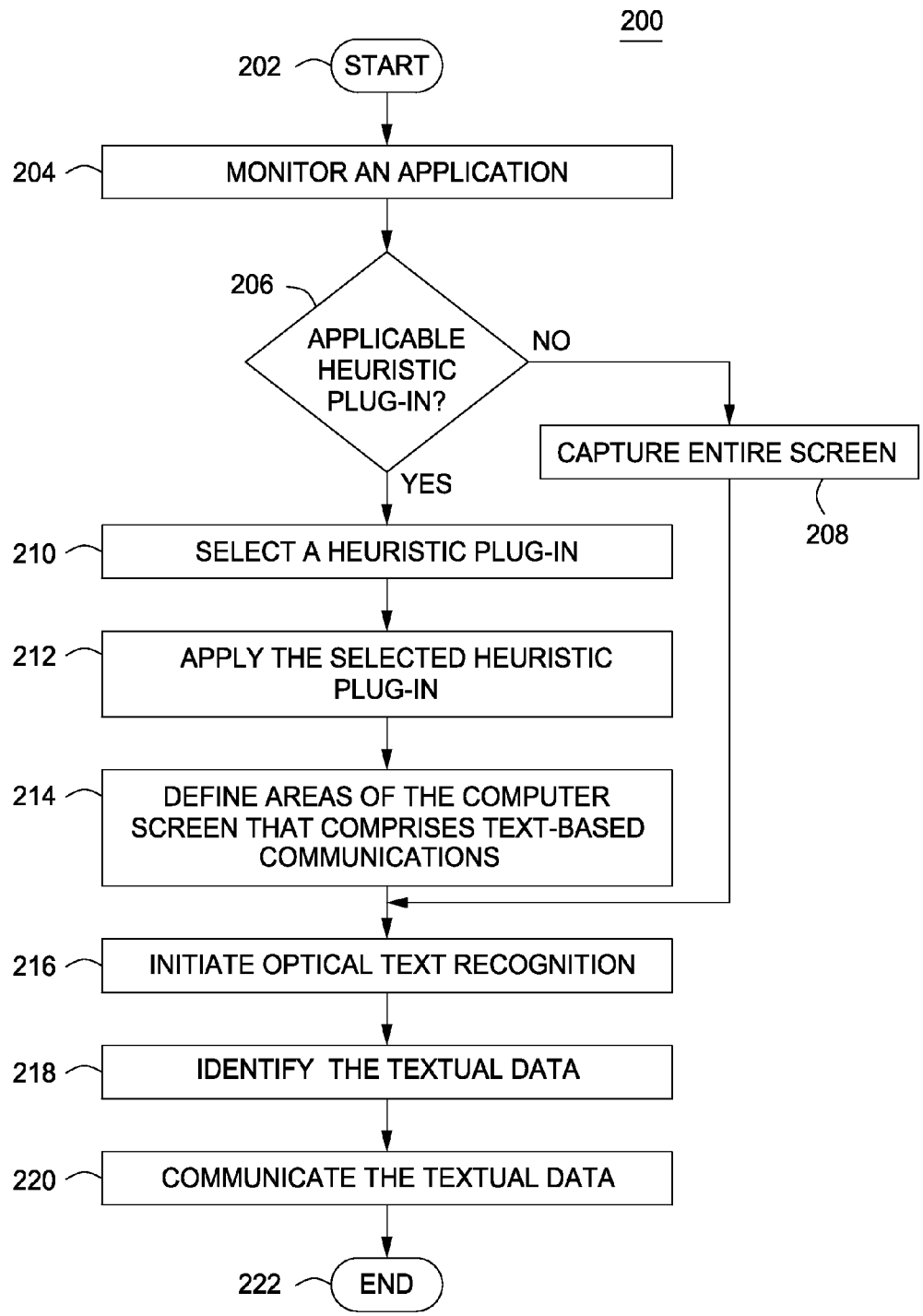
FIG. 2 is a flow diagram of a method 200 for monitoring text-based communications to facilitate information security according to one or more embodiments of the present invention.
Figure 3:
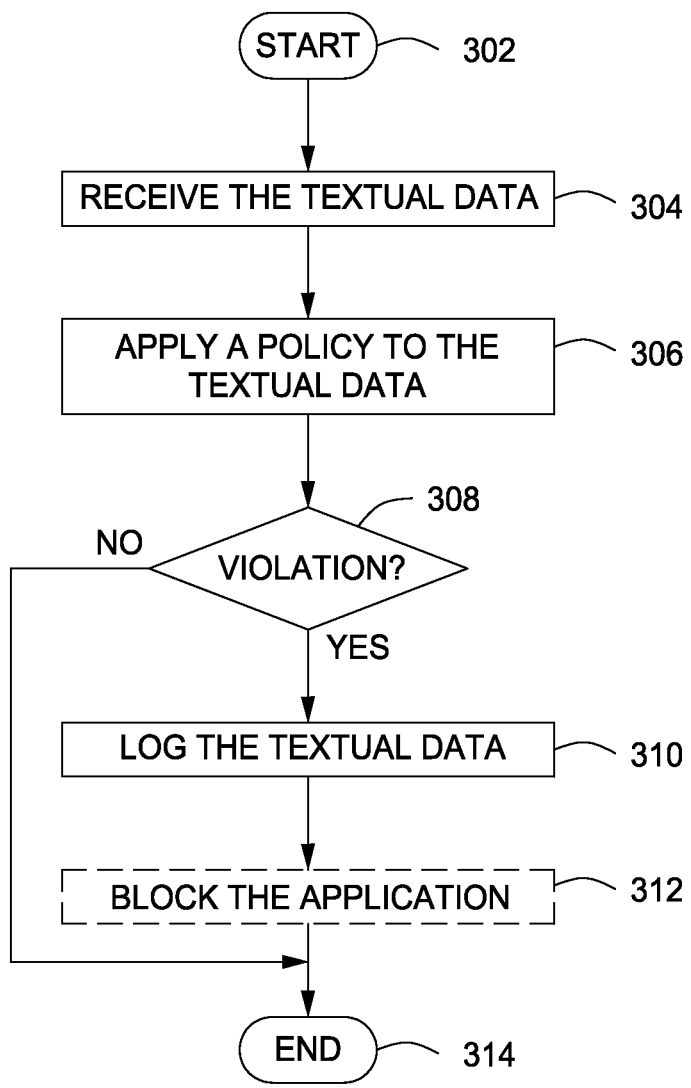
FIG. 3 is a flow diagram of a method 300 for applying a policy to textual data to control text-based communications according to one or more embodiments of the present invention.

FIG. 2 is a flow diagram of a method 200 for monitoring text-based communications to facilitate information security according to one or more embodiments of the present invention. The method 200 starts at step 202 and proceeds to step 204.

At step 204, a software application for enabling text-based communications is monitored. At step 206, a determination is made as to whether there is an applicable heuristic plug-in for a computer screen (e.g., the computer display 120 of FIG. 1). If an applicable heuristic plug-in does not exist, then the method 200 proceeds to step 208. If there is an applicable heuristic plug-in, then the method 200 proceeds to step 210. At step 208, the entire computer screen is captured. In one embodiment, an image of the computer screen is generated and stored for examination. If there is an applicable heuristic plug-in, then the method 200 proceeds to step 210.

At step 210, the applicable heuristic plug-in is selected. At step 212, the selected plug-in is applied to the computer screen. At step 214, one or more areas of the computer screen that comprises text-based communications are defined. At step 216, optical text recognition for the defined areas is initiated. At step 218, textual data is identified from the text-based communications. As mentioned above, an optical text recognition module identifies the textual data within the defined areas according to one embodiment. At step 220, the textual data is communicated. For example, the textual data may be used as input for a policy enforcement and remediation module (e.g., the policy enforcement and remediation module 118 of FIG. 1). At step 222, the method 200 ends.

The method 300 for applying a policy to textual data to control text-based communications according to one or more embodiments of the present invention. The method 300 starts at step 302 and proceeds to step 304.

At step 304, the textual data is received. In one embodiment, the textual data is communicated by an optical text recognition module. At step 306, a policy is applied to the textual data. At step 308, a determination is made as to whether there is a violation of the policy by the textual data. If there is a violation of the policy by the textual data, the method 300 proceeds to step 310. At step 310, the textual data in violation of the policy is logged. Optionally, a software application that facilitates the text-based communications is blocked from utilizing network resources at step 312. If the textual data is not in violation of the policy, the method 300 proceeds to step 314. At step 314, the method 300 ends.

While the foregoing is directed to embodiments of the present invention, other and further embodiments of the invention may be devised without departing from the basic scope thereof, and the scope thereof is determined by the claims that follow.

The invention claimed is:

1. A method for monitoring text-based communications to secure a computer, comprising:
   identifying a type of software application associated with a presentation of text-based communications on a display associated with the computer;
   determining if a heuristic exists for the type of software application, wherein the heuristic is one of a plurality of heuristics each associated with a respective software application;
   defining at least one portion of the computer display that is associated with the text-based communications using the heuristic based at least in part on the type of software application; and
   examining the at least one portion of the computer display to identify textual data within the text-based communications.

2. The method of claim 1, wherein examining the at least one portion of the computer display further comprises comparing the at least one portion of the computer display to at least one character to identify the textual data.

3. The method of claim 1, wherein defining the at least one portion of the computer display further comprises identifying contrasting backgrounds within the computer display to recognize the at least one portion of the computer display that is associated with the text-based communications.

4. The method of claim 1, wherein defining the at least one portion of the computer display further comprises identifying at least one shape within the computer display that is associated with the text-based communications.

5. The method of claim 1, wherein defining the at least one portion of the computer display further comprises identifying the at least one portion of the computer display that is associated with the text-based communications using at least one of a location offset, a window id or location data for at least one of an icon or an image associated with a particular software application.

6. The method of claim 1 further comprising applying a policy to the textual data to determine a violation of the policy based on the textual data.

7. The method of claim 6 further comprising blocking a software application from network resources based on the violation.

8. The method of claim 6 further comprising logging the textual data associated with the violation of the policy.

9. The method of claim 1, wherein defining the at least one portion of the computer display further comprises identifying at least one area of a computer screen that comprises the text-based communications.

10. The method of claim 1, wherein defining the at least one portion of the computer display further comprises selecting a heuristic plug-in that corresponds with a software application that facilitates the text-based communications.

11. An apparatus for monitoring text-based communications to secure a computer, comprising:
    at least one computer processor configured to:
    identify a type of software application associated with a presentation of text-based communications on a display associated with the computer;
    determine if a heuristic exists for the type of software application, wherein the heuristic is one of a plurality of heuristics each associated with a respective software application;
    define at least one portion of the computer display that is associated with the text-based communications using the heuristic based at least in part on the type of software application; and
    examine the at least one portion of the computer display to identify textual data within the text-based communications.

12. The apparatus of claim 11, further configured to apply a policy to the textual data.

13. The apparatus of claim 12, further configured to examine the textual data to determine a violation of the policy.

14. The apparatus of claim 13, further configured to block a software application from network resources based on the violation.

15. The apparatus of claim 13, further configured to log the textual data associated with the violation of the policy.

16. The apparatus of claim 11, further configured to compare the at least one portion of the computer display to at least one character to identify the textual data.

17. The apparatus of claim 11, further configured to identify contrasting backgrounds within the computer display to recognize the at least one portion of the computer that is associated with the text-based communications.

18. The apparatus of claim 11, further configured to identify at least one shape within the computer display that is associated with the text-based communications.

19. The apparatus of claim 11, further configured to define at least one area of a computer screen that comprises the text-based communications.

20. The apparatus of claim 11, further configured to select a heuristic plug-in that corresponds with a software application that facilitates the text-based communications.

* * * * *